United States Patent [19]

Grundmann et al.

[11] Patent Number: 5,107,462

[45] Date of Patent: Apr. 21, 1992

[54] SELF TIMED REGISTER FILE HAVING BIT STORAGE CELLS WITH EMITTER-COUPLED OUTPUT SELECTORS FOR COMMON BITS SHARING A COMMON PULL-UP RESISTOR AND A COMMON CURRENT SINK

[75] Inventors: William R. Grundmann, Hudson, Mass.; Valerie R. Hay, Summit, N.J.; Lawrence O. Herman, Hudson; Dennis M. Litwinetz, Northboro, both of Mass.

[73] Assignee: Digital Equipment Corporation, Maynard, Mass.

[21] Appl. No.: 306,445

[22] Filed: Feb. 3, 1989

[51] Int. Cl.⁵ .............................................. G06F 12/00
[52] U.S. Cl. .......................... 365/189.02; 365/189.05; 365/189.11
[58] Field of Search ................ 364/200, 900; 365/194, 365/189.02, 189.02-189.05, 189.11

[56] References Cited

U.S. PATENT DOCUMENTS

| | | | |
|---|---|---|---|
| 4,623,990 | 11/1986 | Allen et al. | 365/189 |
| 4,663,741 | 5/1987 | Reinschmidt et al. | 365/189 |
| 4,712,190 | 12/1987 | Guglielmi et al. | 364/900 |
| 4,933,909 | 6/1990 | Cushing et al. | 365/230.05 |

Primary Examiner—Gareth D. Shaw
Assistant Examiner—Kalali Chaki
Attorney, Agent, or Firm—Arnold, White & Durkee

[57] ABSTRACT

A self time register (STREG) 44 is constructed on a single custom ECL integrated circuit and has provisions for generating its own internal clock signal. The STREG 44 includes a set of latches 80a–80q for temporarily storing the data delivered thereto concurrent with the system clock pulse. Thereafter, the internally generated clock pulse ($W_{PULS}$) controls the write operation of the temporary latches into the STREG 44. The STREG has data storage registers including bit storage cells which receive the data in response to the internally generated clock pulse. To selectively output the data, the bit storage cells have emitter-coupled output selectors, and the output selectors for common bits share a common current sink and a common pull-up resistor at which a single-bit output signal is provided from a selected register. Preferably, each bit storage cell has a first output selector for a first data output port, and a second output selector for a second data output port. By sharing of a common pull-up resistor and a current sink for each bit position of each output port, an economy of components can be realized.

11 Claims, 6 Drawing Sheets

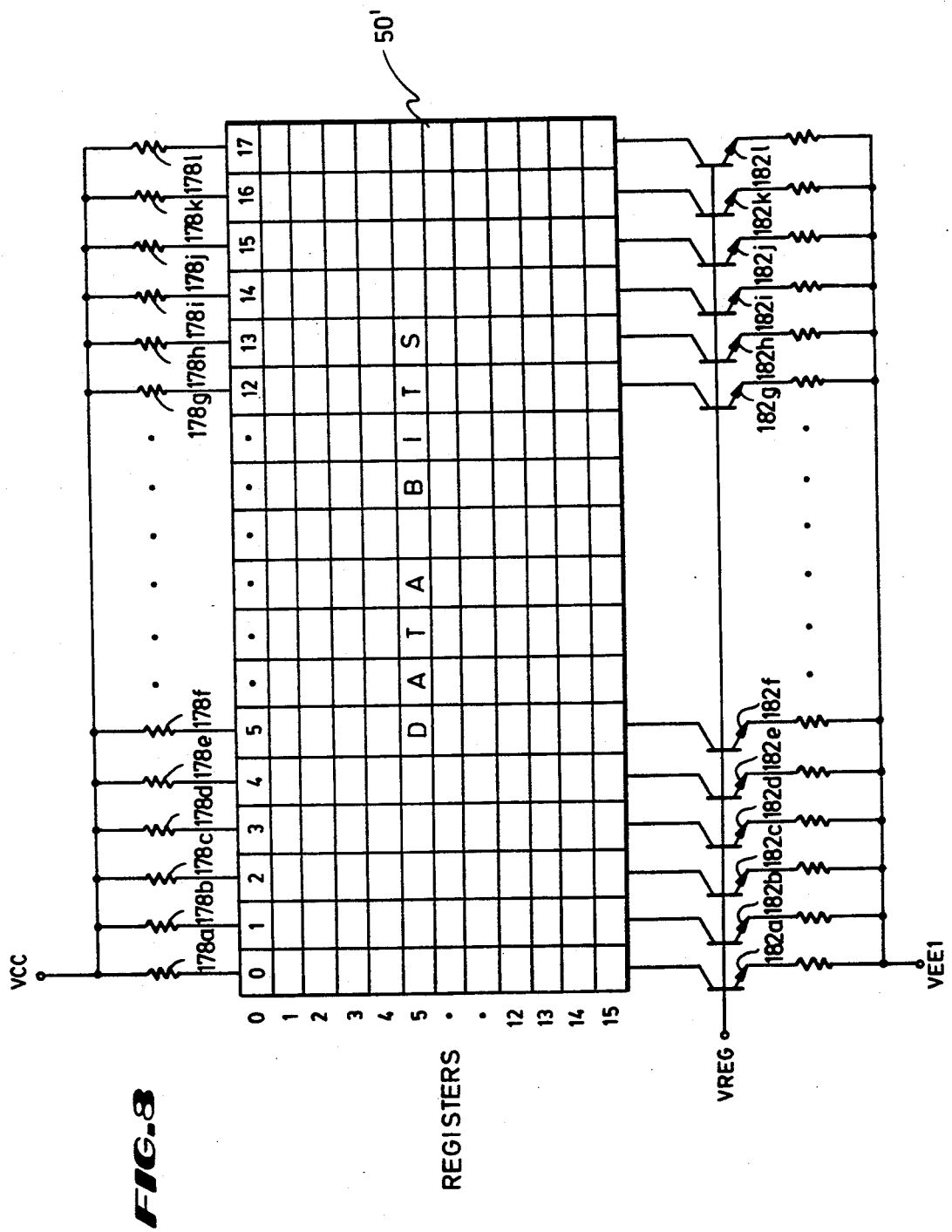

SELF TIMED REGISTER FILE HAVING BIT STORAGE CELLS WITH EMITTER-COUPLED OUTPUT SELECTORS FOR COMMON BITS SHARING A COMMON PULL-UP RESISTOR AND A COMMON CURRENT SINK

RELATED APPLICATIONS

The present application discloses certain aspects of a computing system that is further described in the following U.S. patent application filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,342 filed Feb. 3, 1989, and issued as U.S. Pat. No. 4,994,996 on Feb. 19, 1991; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Chinnaswy et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sept. 14, 1990.

FIELD OF THE INVENTION

This invention relates generally to a register of a computer system and, more particularly, to a custom ECL integrated circuit which includes a self timed register that generates its own register clock pulses internal to the semiconductor chip.

DESCRIPTION OF RELATED ART

In the field of high speed computers, most advanced computers pipeline the entire sequence of instruction activities. A prime example is the VAX 8600 computer manufactured and sold by Digital Equipment Corporation, 111 Powdermill Road, Maynard Mass. 97154-1418. The instruction pipeline for the VAX 8600 is described in T. Fossum et al. "An Overview of the VAX 8600 System," *Digital Technical Journal*, No. 1, August 1985, pp. 8-23. Separate pipeline stages are provided for instruction fetch, instruction decode, operand address generation, operand fetch, instruction execute, and result store. The pipeline stages are usually busy processing successive instructions, but movement through the pipeline cannot always be at top speed. Various stages must sit idle whenever data must be fetched from main memory instead of the high speed cache memory that stores previously addressed data blocks or when a multiplication or division ties up the instruction execution stage.

It can be seen that, in order to maintain the high speed capabilities of the computer, the stages of the pipeline not affected by these memory fetches, multiplication, and division operations should continue to pre-process instructions. However, since these idle stages cannot receive data from the stages that continue to operate, there must be a temporary location in which to store this data until the idled stages are ready to receive it. Accordingly, registers that provide a general temporary storage area are typically provided.

Additionally, temporary storage locations are needed for other areas of computer operation. For example, the execution unit of the CPU often needs access to a scratchpad type area during the execution of certain instructions. The data stored in this scratchpad area is of only temporary use and may be discarded upon completion of the instruction. Registers are typically employed to fulfil this temporary storage need also.

A problematic aspect of the use of registers is the speed at which they must be capable of being accessed. Commonly these registers are fabricated on a separate semiconductor chip and receive their controlling clock pulses, address signals, and data signals from various external sources. The delay induced by the time required for these signals to traverse the physical wires can result in data stability problems. In lower speed computers this presents no real problem since the period of the clock cycle is much greater than the time necessary for the signals to arrive at the separate semiconductor chip. However, in very high speed computers the clock period can be as small as 16 nsec while the clock travel time or wire delay can be as great as 8 or 9 nsec. Thus, there is a very real possibility that the data to be written in the registers will become unstable before the register store can be completed. For example, if the set-up time required for the signals to transition between their asserted and unasserted states is 8 nsec and the wire delay accounts for the first 9 nsec of the clock pulse, then the data may change states after the 16 nsec clock pulse transition but before the completion of the storage process.

SUMMARY OF THE INVENTION

A self timed register file constructed from emitter-coupled logic circuits includes a plurality of storage registers, each having a multiplicity of bit storage cells; a set of latches responsive to a clock signal including an address latch for temporarily storing a register address and a data latch for temporarily storing data to be written to an addressed one of the registers during a write operation; an address decoder connected to the address latch for addressing the addressed one of the registers; a write pulse generator responsive to the clock signal for generating a write pulse enabling the addressed one of the registers to receive stable data from the data latch; and an output multiplexer connected to data outputs of said registers for selectively connecting a data output of a selected one of the registers to a data output port; wherein the output multiplexer includes for each bit storage cell an emitter-coupled output gate coupled to the bit storage cell and having a data output connection and a current sink connection, and wherein the output multiplexer further includes for each bit position a common pull-up resistor connected to the data output connections of the emitter-coupled output gates of the bit storage cells for the bit position, and a common current sink connected to the current sink connections of the emitter coupled output gates of the bit storage cell for the bit position.

BRIEF DESCRIPTION OF THE DRAWINGS

Other objects and advantages of the invention will become apparent upon reading the following detailed description and upon reference to the drawings in which:

FIG. 8 is a functional diagram of the relationship between the common pull-up resistors, current sink, and registers.

Figure 1:
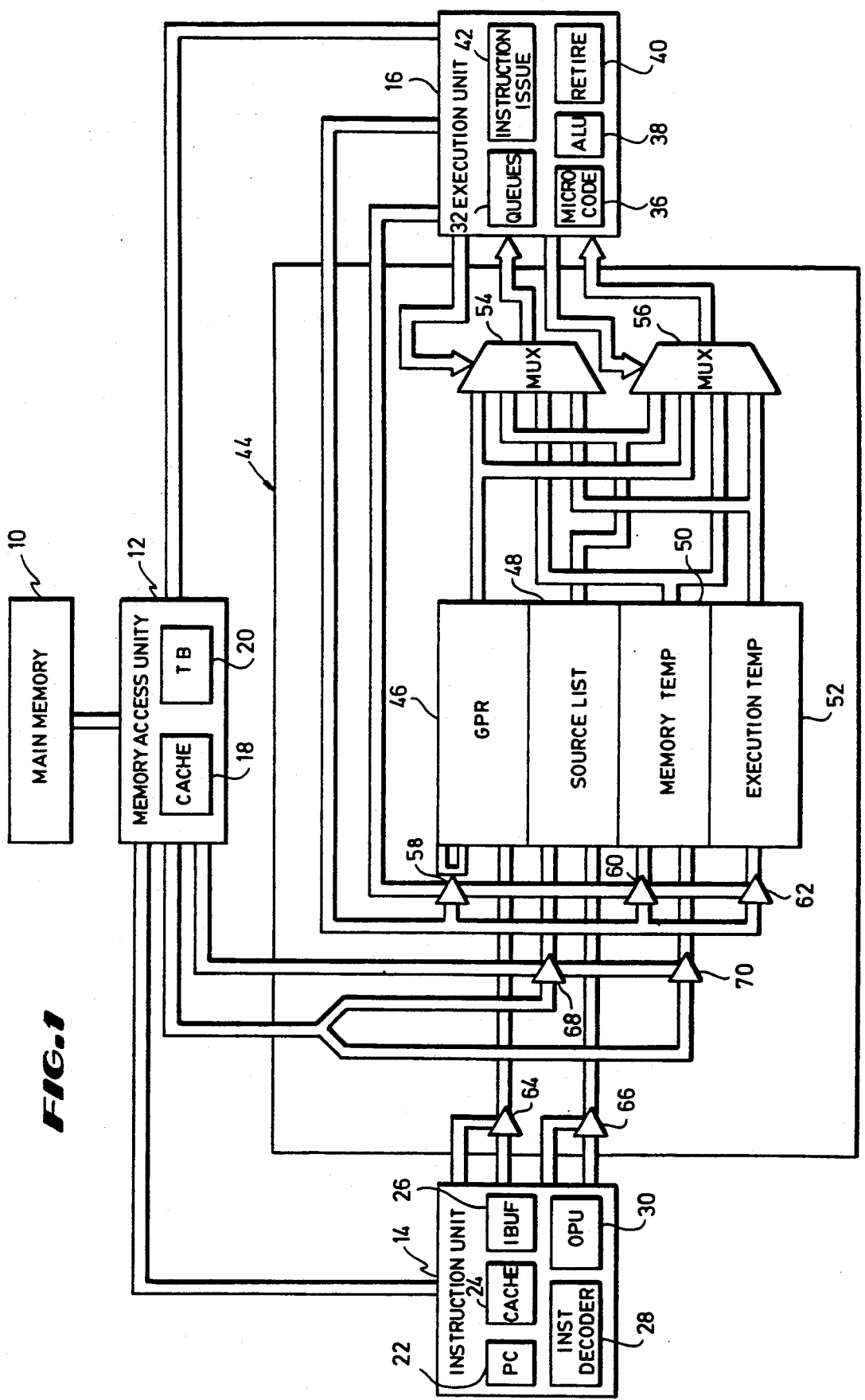
FIG. 1 is a block diagram of a computer system.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, there is shown a top level diagram of a portion of a digital computer system which includes a main memory 10, a memory access unit 12, and at least one CPU including an instruction unit 14 and an execution unit 16. Both data and instructions for processing the data are stored in addressable storage locations within the main memory 10. An instruction includes an operation code (opcode) that specifies, in coded form, an operation to be performed by the CPU and operands, identified by specifiers, that provide the information needed to locate the operands.

Inside the CPU, the execution of an individual instruction is broken down into multiple smaller tasks. These tasks are performed by dedicated, separate, independent functional units that are optimized for that purpose.

Although each instruction ultimately performs a different operation, many of the smaller tasks, into which each instruction is broken, are common to all instructions. Generally, the following steps are performed during execution of an instruction: instruction fetch, instruction decode, operand fetch, execution, and result store. Thus, by the use of dedicated hardware stages, the steps can be overlapped in a pipelined operation, thereby increasing the total instruction throughput.

The data path through the pipeline includes a respective set of registers for transferring the results of each pipeline stage to the next pipeline stage. These transfer registers are clocked in response to a common clock cycle. For example, during a first clock cycle the first instruction is fetched by hardware dedicated to instruction fetch. During the second clock cycle, the fetched instruction is transferred and decoded by instruction decode hardware, but at the same time the next instruction is fetched by the instruction fetch hardware During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product moves closer to completion. At the final stage, each time the worker performs his assigned task, a completed product rolls off the assembly line.

In the particular system illustrated in FIG. 1, the memory access unit 12 includes a main cache 18 which on an average basis enables the instruction and execution units 14, 16 to process data at a faster rate than the access time of the main memory 10. This cache 18 includes means for storing selected predefined blocks of data elements, means for receiving requests from the instruction unit 14 via a translation buffer 20 to access a specified data element, means for checking whether the data element is in a block stored in the cache 18, and means operative when the data for the block, including the specified data element, is not so stored, for reading the specified block of data from the main memory 10 and then storing that block of data in the cache 18. In other words, the cache provides a "window" into the main memory, and contains data likely to be needed by the instruction and execution units 14, 16.

If a data element needed by the instruction and execution units 14, 16 is not found in the cache 18, then the data element is obtained from the main memory 10, but in the process, an entire block, including additional data, is obtained from the main memory 10 and written into the cache 18. Due to the principle of locality in time and memory space, the next time the instruction and execution units 14, 16 desire a data element there is a high degree of likelihood that this data element will be found in the block which includes the previously addressed data element Consequently, there is a high degree of likelihood that the cache 18 will already include the data element required by the instruction and execution units 14, 16. In general, since the cache 18 will be accessed at a much higher rate than the main memory 10, the main memory can have a proportionally slower access time than the cache 18 without substantially degrading the average performance of the data processing system. Therefore, the main memory 10 can be constructed of slower and less expensive memory components The translation buffer 20 is a high speed associative memory which stores the most recently used virtual-to-physical address translations. In a virtual memory system, a reference to a single virtual address can cause several memory references before the desired information is made available. However, where the translation buffer 20 is used, the translation is reduced to simply finding a "hit" in the translation buffer 20.

The instruction unit 14 includes a program counter 22, an instruction cache 24, and an instruction buffer (I-buffer) 26 for fetching instructions from the main cache 18. From the I-buffer 26, new instructions are fed to an instruction decoder 28 which decodes both the opcodes and the specifiers. An operand processing unit (OPU) 30 fetches the specified operands and supplies them to the execution unit 16.

Program counter 22 is maintained in the instruction unit 14, so that the proper instructions can be retrieved from the cache 18. The program counter 22 preferably uses virtual memory locations rather than the physical memory locations of the main memory 10 and the cache 18. Thus, the virtual address of the program counter 22 must be translated into the physical address of the main memory 10 before instructions can be retrieved. Accordingly, the contents of the program counter 22 are transferred to the memory access unit 12 where the translation buffer 20 performs the address conversion. The instruction is retrieved from its physical memory location in the cache 18 using the converted address. The cache 18 delivers the instruction over data return lines to the instruction buffer 26. The organization and operation of the cache 18 and the translation buffer 20 are further described in Chapter 11 of Levy and Eckhouse, Jr. *Computer Program and Architecture. The VAX 11*, Digital Equipment Corporation, pp. 351-368 (1980).

The OPU 30 also produces virtual addresses. In particular, the OPU 30 produces virtual addresses for memory source (read) and destination (write) instructions. The OPU 30 delivers these virtual addresses to the memory access unit 12 where they are translated to physical addresses. The physical memory locations of the cache 18 are then accessed to fetch the operands for the memory source instructions.

In each instruction, the first byte contains the opcode and the following bytes are the operand specifiers to be decoded. The first byte of each specifier indicates the addressing mode for that specifier. This byte is usually broken into halves, with one half specifying the addressing mode and the other half specifying the register to be used for addressing.

The first step in processing the instructions is to decode the opcode portion of the instruction. The first portion of each instruction consists of its opcode which specifies the operation to be performed in the instruction. The decoding is done using a standard table-lookup technique in the instruction decoder 28. The instruction decoder 28 finds a microcode starting address for executing the instruction in a look-up table and passes the starting address to the execution unit 16. Later, the execution unit performs the specified operation by executing pre-stored microcode, beginning at the indicated starting address. Also, the decoder determines where source-operand and destination-operand specifiers occur in the instruction, and passes these specifiers to the OPU 30 for pre-processing prior to execution of the instruction.

After an instruction has been decoded, the OPU 30 passes the operand specifiers and computes their effective addresses; this process involves reading general purpose registers (GPRs) and possibly modifying the GPR contents by autoincrementing or autodecrementing. The operands are then fetched from those effective addresses and passed on to the execution unit 16, which executes the instruction and writes the result into the destination identified by the destination pointer for that instruction The OPU 30 also delivers a 3-bit control field to indicate whether the instruction specifies a read or write operation.

Each time an instruction is passed to the execution unit 16, the instruction unit 14 sends a microcode dispatch address and a set of pointers for: (1) the locations in the execution-unit register file where the source operands can be found; and (2) the location where the results are to be stored. Within the execution unit 16, a set of queues 32 includes a fork queue for storing the microcode dispatch address, a source pointer queue for storing the source-operand locations, and a destination pointer queue for storing the destination location. Each of these queues is a FIFO buffer capable of holding the data for multiple instructions.

For executing instructions, the execution unit 16 includes, as separate functional execution units, a microcode execution unit 36, an arithmetic logic unit (ALU) 38 and a retire unit 40. The issuing of instructions to these functional units is controlled by an instruction issue unit 42. An instruction is issued when the desired functional execution unit is available, and when the source operands are valid. Register operands are checked for pending writes by inspecting a result queue in the execution unit before an instruction is issued.

To facilitate the interface between the memory access unit 12, instruction unit 14 and execution unit 16, a self-timed register file (STREG) 44 is provided. This STREG 44 may properly be thought of as functionally part of the execution unit 16; however, it should be noted that the STREG 44 is constructed on a separate custom ECL integrated circuit. This physical isolation of the STREG 44 introduces critical timing problems resulting from signal travel time or clock skew. These timing problems are overcome by generating the actual timing pulses for the STREG 44 within the custom ECL chip, thereby making the registers self timing.

Preferably, the registers include four sets of sixteen registers with each register being 36-bits in length. In this case, two of the same kind of integrated circuits are used in combination to provide the four sets of sixteen 32-bit registers. Each register is configured to contain four bytes plus a parity bit for each byte. The four sets respectively correspond to GPRs 46, the source list 48, memory temporary registers 50 and execution temporary registers 52. These registers have dual-port outputs and include a pair of multiplexers 54, 56 having their inputs connected to each of the sixteen registers in each of the four sets of registers. The 36-bit multiplexer outputs are connected directly to the execution unit 16. Select lines are connected between the execution unit 16 and the select inputs of the multiplexer 54, 56. These select lines provide a 6-bit signal to allow addressing of each of the sixty-four individual registers. The inputs to the each of the registers 46, 48, 50, 52 are also of the dual-port variety and accept both A and B data inputs. However, it should be noted that while the four sets of registers are each of the dual-port variety, the STREG 44 receives inputs from three distinct sources and routes those inputs such that no more than two inputs are delivered to any one of the four sets of registers.

The source list 48 is a register file containing source operands. Thus, entries in the source pointer queue of the execution unit 16 point to the source list for memory and immediate or literal operands. Both the memory access unit 12 and the instruction unit 14 write entries to the source list 48, and the execution unit 16 reads operands out of the source list as needed to execute the instructions.

The GPRs 46 include sixteen general purpose registers as defined by the VAX architecture. These registers provide storage for source operands and the results of executed instructions. Further, the execution unit 16 writes results to the GPRs 46, while the instruction unit 14 updates the GPRs 46 for autoincrement and autodecrement instructions.

The memory temporary registers 50 include sixteen high-speed registers accessible by the execution unit 16 and the memory access unit 12. The memory access unit 12 writes data requested by the execution unit 16. Further, the microcode execution unit 36 may also initiate writes to the memory temporary registers as needed during microcode execution.

The execution temporary registers 52 include sixteen high-speed registers accessible by the execution unit 16 alone. More specifically, the microcode execution unit 36 uses the execution temporary registers 52 for intermediate storage.

The execution unit 16 is connected to the GPR 46, the memory temporary register 50, and the execution temporary register 52 via a 36-bit data bus. Transmission gates 58, 60 and 62 respectively control the data delivered from the execution unit data bus to the GPRs 46, memory temporary registers 50, and execution temporary register 52 via a 6-bit select bus connected to the select inputs of the transmission gates 58, 60, 62.

Similarly, the instruction unit 14 is connected to the B inputs of GPR 46 and source list 48 via transmission gates 64, 66. In this case, however, the select lines of the transmission gates 64, 66 are separate from one another and are controlled independently. The purpose for the independent addressability is to reduce the number of clock cycles necessary to perform autoincrement and autodecrement move address instructions which are hardware implemented.

The memory access unit 12 has a 72-bit data bus and, thus, preferably writes to a pair of 36-bit registers. Therefore, the bus is split into a low order 36-bit portion and a high order 35-bit portion to allow the data to be stored at consecutive register addresses. The low order 36-bits are delivered to either the source list 48 through transmission gate 68, or through transmission gate 70 to the memory temporary register 50. Physically, in the preferred implementation introduced above using two of the same kind of integrated circuits, the higher-order 18 bits of each 32 bit portion are stored in one of the integrated circuits, and the corresponding lower-order 18 bits of the 32 bit portion are stored on the other integrated circuit.

The memory access unit 12 also delivers a 7-bit select bus to the transmission gates 68, 70. The additional bit is used to allow the memory access unit 12 to write the high order 36-bits being delivered to the next sequential register of either the source list 48 through transmission gate 68, or through transmission gate 70 to the memory temporary register 50. Thus, the high order 36-bits are stored in either the source list 48 or the memory temporary register 50 at a location one greater than the low order 36-bits stored in the same register. Therefore, when the execution unit 16 retrieves the data stored in the source list and memory temporary registers 48, 50 it first retrieves the data stored in the low order 36-bits, increments its internal pointer and then retrieves the high order 36-bits without recalculating a second address.

Figure 2:
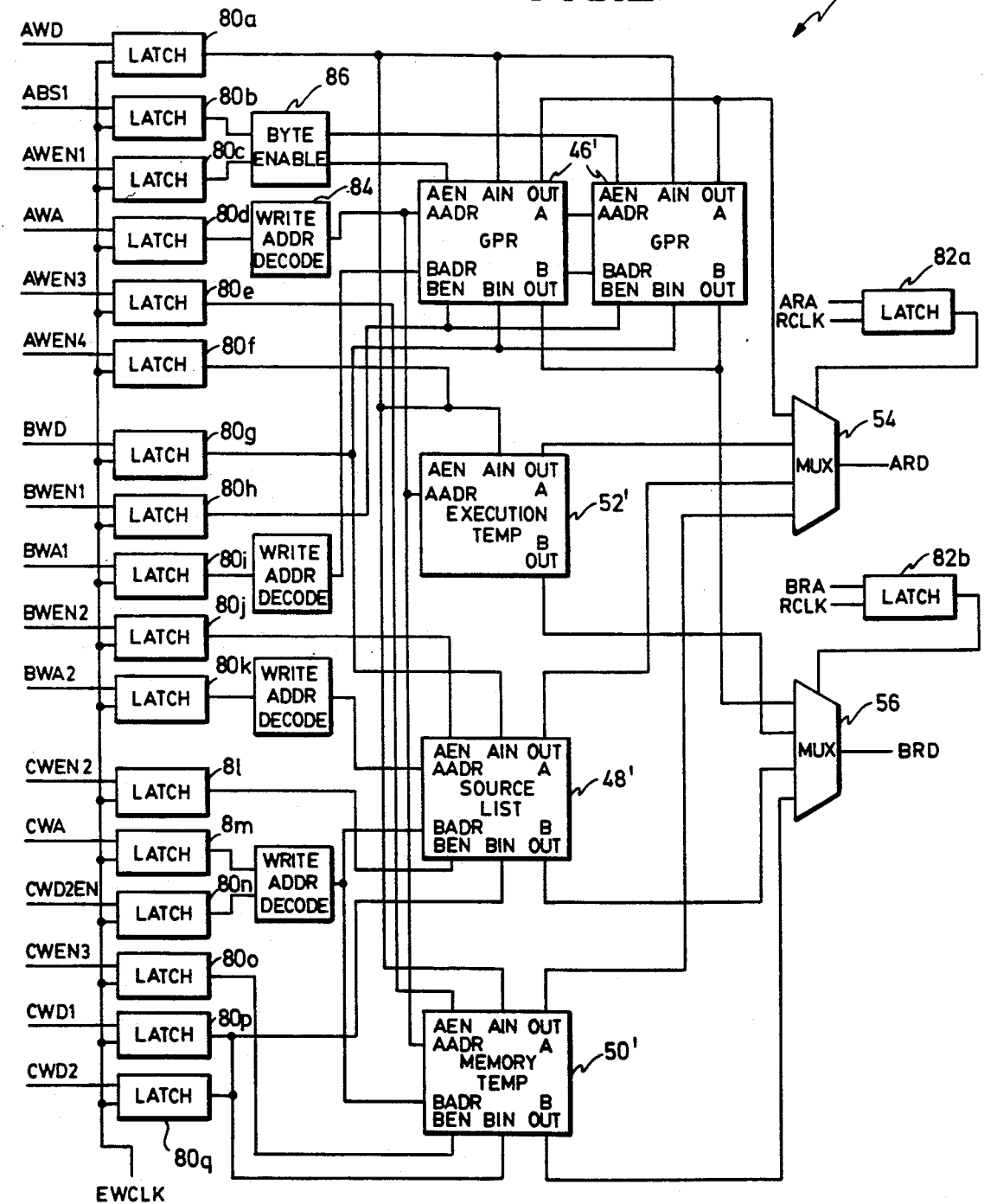
FIG. 2 is a detailed block diagram of an integrated circuit for making the self timed registers.

Referring now to FIG. 2, there is shown a detailed block diagram of an integrated circuit 44' for providing the self-timed register file (STREG) 44 of FIG. 1. As introduced above, two of the integrated circuits 44' are used in combination, with their address lines connected in parallel, to provide 32-bit data registers.

In the STREG integrated circuit (IC) 44', a series of latches 80a–80q receive all of the external input lines and store the data present thereon concurrent with the system clock EWCLK. These latches 80a–80a are divided into three groups (A,B,C) corresponding to the outputs from the execution, instruction, and memory access units 16, 14, 12. The data present at the inputs to the latches 80a–80a is held in response to a EWCLK transition to its unasserted state. Thus, the STREG IC 44' is assured of stable data on the latch outputs during the period that EWCLK remains in its unasserted state. Since the STREG IC 44' generates its own internal clock pulse as a function of the system clock, the latch outputs may properly be assumed to be stable during the internal clock pulse.

Similarly, latches 82a–82b receive the read addresses from the execution unit 16 and store these addresses in response to the system clock RCLK.

The address bus (AWA) from the execution unit 16 is delivered into the latch 80d which in turns delivers its output to a write address decoder 84. The write address decoder 84 produces a 16-bit output delivered to the A address input of the GPR register 46', the execution temporary register 52', and the memory temporary register 50'. In this manner, the address delivered by the execution unit 16 controls which of the 16 registers within the three groups of registers 46', 52', 50' is accessed. However, to select which of the groups of registers is enabled, write enable signals (AWEN1, AWEN3, AWEN4) are delivered to the latches 80c, 80e and 80f. These latches are in turn connected to the A enable input of the GPR register 46', memory temporary register 50', and execution temporary register 52'. Data (AWD) to be written at the address and register indicated is delivered to the latch 80a from the execution unit 16. The output of the latch 80a is connected to the A' data input of the GPR register 46', execution temporary register 52', and the memory temporary register 50'. An asserted signal on the A enable inputs of the registers 44' results in the data present at the A data input being stored in the register indicated at the A address input.

It should be noted that the execution temporary register 52 in FIG. 1 and memory temporary register 50 in FIG. 1 are addressable only in 36-bit increments, whereas, the GPR register 46 in FIG. 1 is addressable in 9-bit increments. (Recall also that any one STREG IC 44' of FIG. 2 contains half of each of the registers in FIG. 1). The VAX instruction set allows for writes to the bytes of the low order word of the GPR register 46 in FIG. 1. To provide for this individual byte addressability, the latch 80b receives a byte select signal (ABS) from the execution unit 16. ABS is combined with AWEN1 to select which of the bytes is to be written. The outputs of the latches 80b, 80c are delivered to a byte enable logic circuit 86. The byte enable circuit 86 has two outputs connected to the A enable inputs of the upper and lower bytes of the GPR register 46'. The truth table for the byte enable circuit 86 is as follows:

| AWEN 1 | ABS | GPR |
|---|---|---|
| 0 | 0 | none |
| 0 | 1 | none |
| 1 | 0 | 8:0 |
| 1 | 1 | 17:0 |

Access to the lower 9-bits of each word in the GPR register 46' is necessary during a move byte instruction in the VAX instruction set. This instruction allows a byte of data to be moved from memory into the GPR 46 of FIG. 1.

Outputs from the instruction unit 14 are delivered to the latches 80g–80k. The latch 80g receives the write data (BWD) and delivers it to the B inputs of the GPR register 46' and to the A inputs of the source list register 48'. The latches 80i and 80k receive the addresses (BWA1, BWA2) on the two independently accessible address buses of the instruction unit 14 and deliver those addresses respectively to write address decoders 88a, 88b. The write address decoders 88a, 88b are similar in construction to the write address decoder 84 and operate substantially identical thereto. The output of the write address decoder 88a is delivered directly to the B address input of the GPR register 46'. The B enable inputs of the GPR register 46' are both connected to the outputs of the latch 80h which receives a write enable signal (BWEN1) from the instruction unit 14.

Similarly, the write address decoder 88b has an output connected to the A address input of the source list 48. The A enable input of the source list 48 is connected to the output of the latch 80j which also receives a write enable input (BWEN2) from the instruction unit 14.

The latches 80l–80q receive outputs from the memory access unit 12. Because the memory access unit bus is 72-bits wide it is necessary to perform two write operations to two sequential register addresses to store all of the data. Accordingly, the 72-bit wide bus is split into two 36-bit wide buses (CWD1, CWD2) and delivered to the latches 80p, 80q. The output of the latches 80p, 80q are delivered to the B inputs of the source list register 48' and the memory temporary register 50'. The latch 80m receives the write address (CWA) from the memory access unit 12 and passes it to a write address decoder 90. A "write location two enable signal" (CWD2EN) is delivered to latch 80n from the memory access unit 12 and is also passed as an input to the write address decoder 90. When CWD2EN is not asserted, the write address decoder 90 passes a register enable signal to the B address inputs of the source list register 48' and the memory temporary register 50'. When CWD2EN is asserted, the write address decoder 90 additionally delivers the next sequential address to the B address inputs of the source list 48' and memory temporary register 50'. This is accomplished by a physical rotation of the wiring arrangement to the B address inputs of the source list and memory temporary register. For example, bit 15 of the write address decoder 90 is rotated to position 0 with the remaining fifteen bits incremented by one position.

Write enable signals (CWEN2, CWEN3) are delivered from the memory access unit 12 to the latches 80l and 80o. The latches 80l, 80o are, in turn, respectively connected to the B enable inputs of the source list 48' and memory temporary register 52'. These inputs control whether the memory access unit 12 will store data into registers in the source list 48' or the memory temporary register 50'. For example, if CWEN2 is asserted, the long word is stored in the source list 48', whereas, if CWEN3 is asserted by the memory access unit 12, the memory temporary register 50 is accessed.

In order for the execution unit 16 to read the STREG 44, the A data outputs of each of the groups of registers is delivered to the multiplexer 54. Similarly, the B data outputs of each of the groups of registers is delivered to the multiplexer 56. Accordingly, the select lines of the multiplexer 54 are controlled by the A read address lines (ARA) from the execution unit 16 via the latch 82a. Similarly, the select lines of the multiplexer 56 are controlled by the B read address lines (BRA) from the execution unit 16 via the latch 82b.

Thus, at any one time, the execution unit 16 may read one of the B data outputs of any of the groups of registers and the A data outputs of any of the groups of registers, including the A and B data output of the same register For example, the same address may be delivered to the select lines of both of the multiplexers 54, 56 resulting in both multiplexers 54, 56 reading the same register and producing the same data output. Further, any two registers within any one of the four groups of registers may be read simultaneously at the outputs of the two multiplexers 54, 56.

Figure 3:
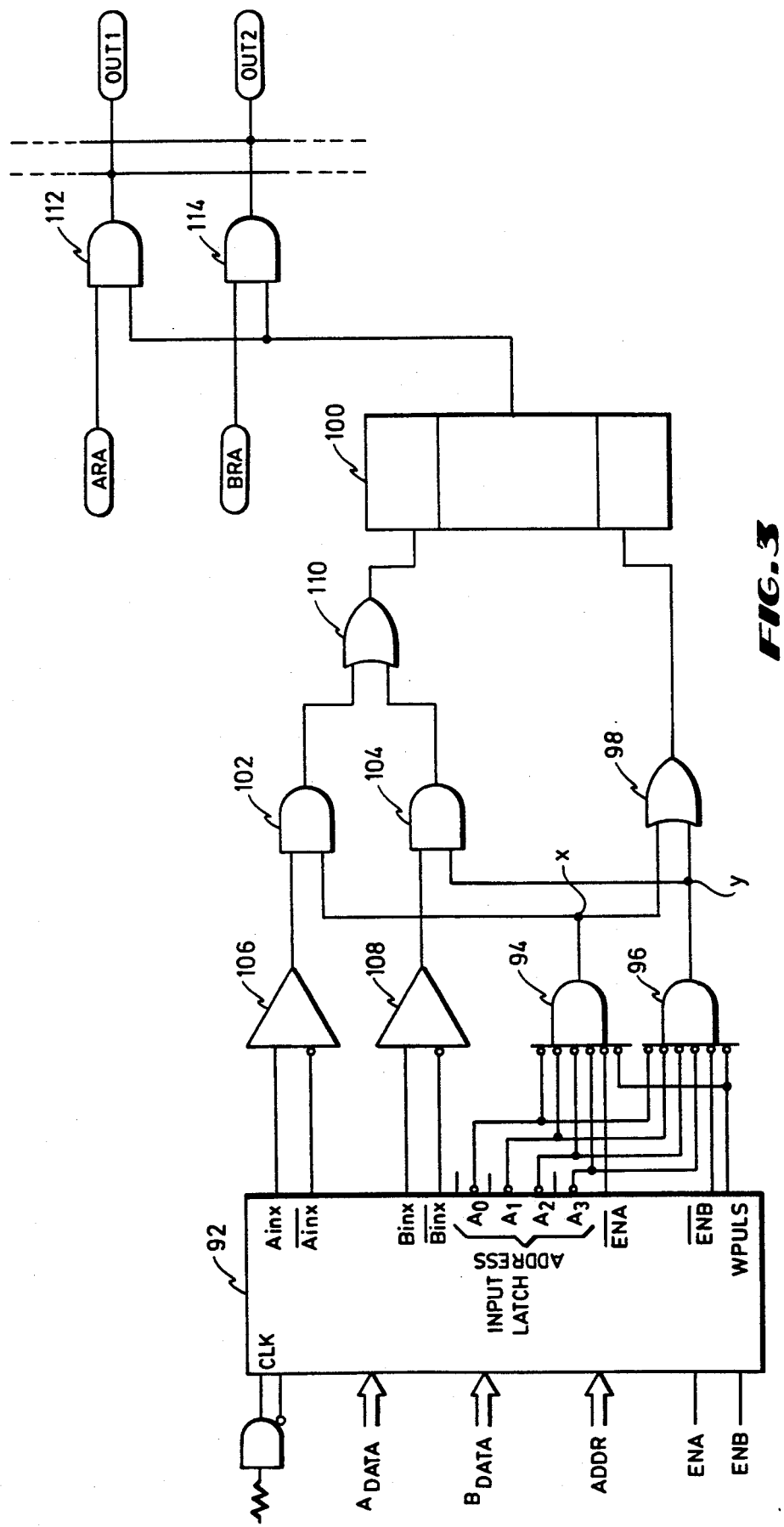
FIG. 3 is a detailed functional diagram of a single bit of the self timed registers.

Referring now to FIG. 3, there is shown a detailed functional diagram of the circuits for a single bit of the self-timed registers 44. It should be noted that this is a functional diagram only and is shown for purposes of explaining the operation of a single bit of the registers 44. The preferred construction of the actual circuits is further described below in connection with FIGS. 6, 7 and 8.

In FIG. 3, the latches 80a–80a are shown collectively as a single latch 92. The actual bit illustrated in FIG. 3 is bit number 4 of one of the 16 registers in one of the groups of registers.

It can be seen that the address lines A0–A3 are present at the output of the latch 92 and are delivered to a pair of NOR gates 94, 96. The NOR gates 94, 96 also respectively receive the write enable A and B inputs, as well as, a sixth input. This sixth input is the internally generated STREG clock pulse ($W_{PULS}$) which controls the write operation of the registers 44. Accordingly, the outputs of the NOR gates 94, 96 are asserted only when all of the inputs are not asserted. For example, the NOR gate 94 will only be asserted when bit 4 is selected by the address bus, the write enable A line is "low", and $W_{PULS}$ is pulsed "low".

This asserted signal delivered by either of the NOR gates 94, 96 is passed through an OR gate 98 to the clock input of a latch 100. The outputs of the NOR gates 94, 96 are also delivered to the inputs of AND gates 102, 104 respectively. The second inputs to the AND gates 102, 104 respectively, are the A and B data input lines. The A data and B data lines are delivered through differential amplifiers 106 and 108 to reduce the noise present on those lines. Therefore, it can be seen that the outputs of the NOR gates 94, 96 act to enable the AND gates 102, 104 to pass either the data on the A data input line or the B data input line to an OR gate 110. The OR gate 110, in turn, passes the data signal to the data input of the latch 100.

The output of latch 100 is connected to one input of a pair of AND gates 112, 114. The second input to the AND gates 112, 114 are connected to the corresponding A and B read address (ARA, BRA) lines of the multiplexers 54 and 56. In fact, the AND gates 112, 114 form a portion of the multiplexers 54 and 56. It should be appreciated that the data present in the latch 100 is passed through the AND gates 112, 114 in response to the ARA and BRA lines respectively being asserted.

Figure 4:
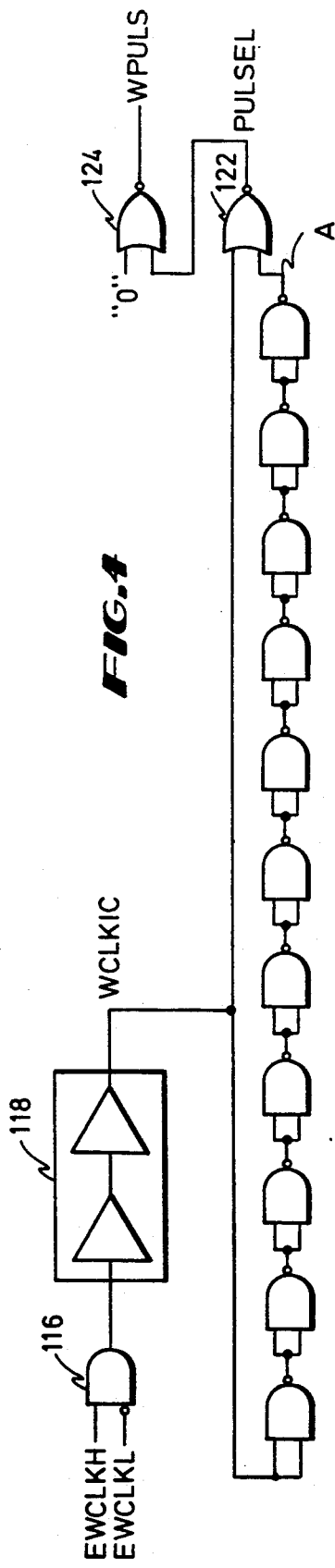
FIG. 4 is a logic diagram of the control circuit for producing the self timed clock signal.
Figure 5:
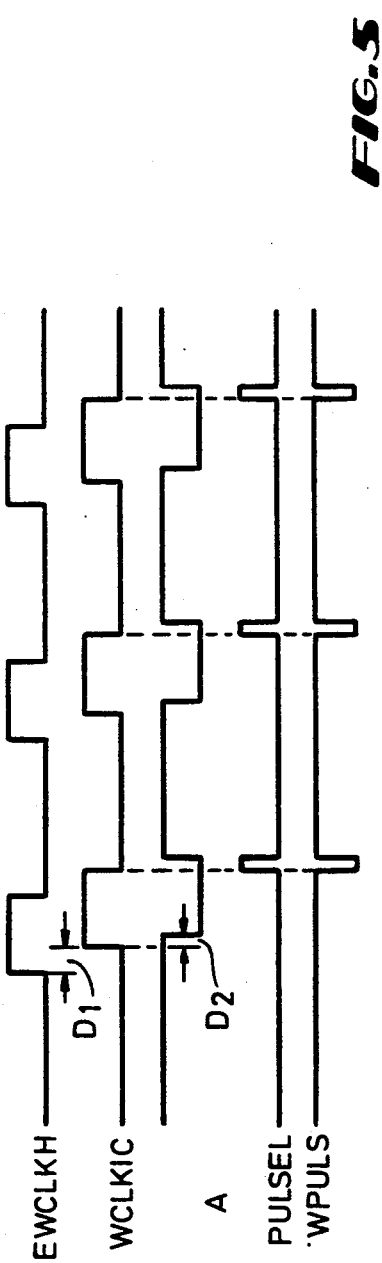
FIG. 5 is a schematic representation of a series of electrical waveforms corresponding to selected test points on the logic diagram of FIG. 4.

Referring now to FIGS. 4 and 5 concurrently, the logic circuit for generating the write pulse signal $W_{PULS}$ is illustrated along with representative waveforms at identified locations in the logic circuit. The system clock EWCLKH and the inversion of the system clock EWCLKL are delivered to the inputs of AND gate 116. The inverted system clock EWCLKL is delivered through an additional inverter, thus, the AND gate 116 acts to reduce the noise present on those lines. The output of the AND gate 116 is delivered to a delay circuit 118 which provides an output WCLKIC identical to its input but delayed by a time period D1, as shown in FIG. 5. The time period D1, for example, is about 0.3 nsecs to guarantee that the data and address are present and stable in the input latches 92 before writing the data to that desired register location. This delayed signal WCLKIC is delivered through a series of eleven inverters 120, whereby, a second delay D2 is produced, as shown in FIG. 5. This second delay D2 is, for example, about 1.5 nsecs. Thus, the output of the eleven inverters 120 is inverted and delayed by time period D2 when compared to its input, WCLKIC. The two signals WCLKIC and A are combined in a NOR gate 122, such that, a waveform is produced having a pulse D2 in duration an delayed by a time period of D1 from the trailing clock edge of the system clock EWCLKH. This pulse signal is passed through a final inverter 124 to produce the final write pulse signal $W_{PULS}$. The time period D2 is sufficient to meet set-up and hold time requirements for the register latch 100.

It should be recognized that the latches 80a–80q are loaded on only the asserted transition of EWCLKH and the AND gates 102, 104 pass the data input to the latch 100 during only the unasserted portion of $W_{PULS}$. Thus, by selecting the time period D1 to be of a duration greater than the travel time of any signal delivered to the STREG 44, the data and addresses are assured of being stable at the beginning of $W_{PULS}$. Likewise, by selecting the time period D2 to be of a duration less than the remainder of the system clock pulse EWCLKH, the data and addresses are assured of remaining stable throughout $W_{PULS}$.

Figure 6:
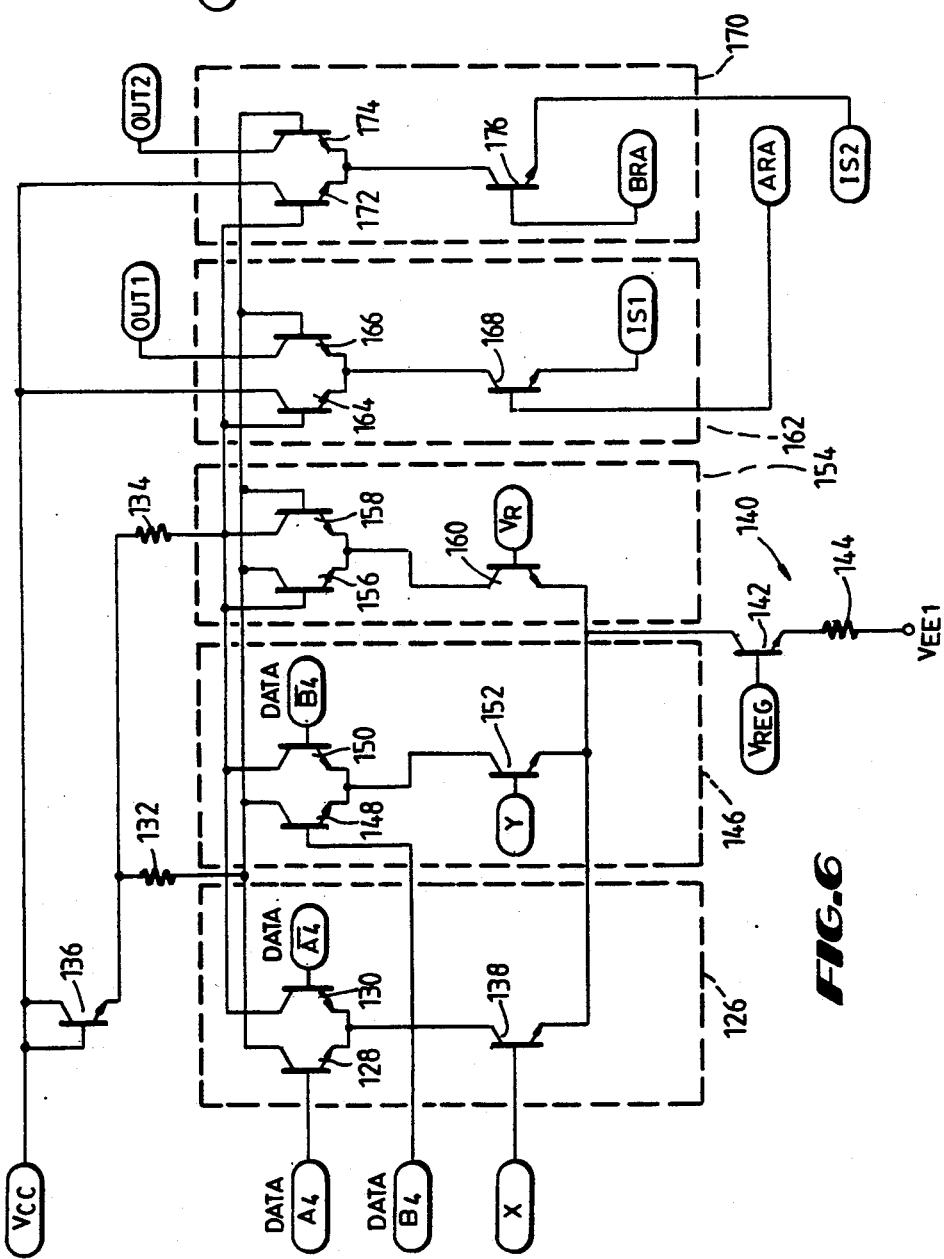
FIG. 6 is an electrical schematic of an implementation of the functional diagram of FIG. 3.

Referring now to FIG. 6, an electrical schematic of an implementation of the functional diagram of FIG. 3 is shown. It should be remembered that the functional diagram for FIG. 3 is for illustrative purposes only and there is not a direct one-to-one correspondence of the elements shown therein to the elements shown at FIG. 6. There is, however, functional equivalence between the two. For example, the elements enclosed within the dashed line indicated as 126 corresponds to the AND gate 102 and differential amplifier 106. Transistors 128 and 130 are connected in parallel and correspond to the differential amplifier 106. The controlling inputs to the bases of the transistors 128, 130 are, in the illustrated example, connected to the fourth data bit and the inverted fourth data bit respectively. Accordingly it can be seen that only one of the transistors 128, 130 is biased on at any one time. For example, if data bit 4 is asserted, then the transistor 128 is biased "on" and inverted data bit 4 must necessarily bias transistor 130 "off." The collectors of the transistor 128, 130 are respectively connected through resistors 132, 134 and transistor 136 to a source voltage $V_{CC}$.

A transistor 138 connected in series with the parallel combination of transistors 128, 130 forms the AND gate 102. The base of the transistor 138 receives its controlling input from the NOR gate 94. The output of the NOR gate 94 swings between −2.1 volts when not asserted and approximately −1.6 volts when asserted, thereby controlling the transistor 138 to be biased "off" or "on" respectively. The emitter of the transistor 138 is connected to a current source 140. The current source 140 includes a transistor 142 connected in series with a resistor 144. The base of the transistor 142 is connected to a regulating voltage $V_{REG}$; thus, the current regulator 140 maintains the constant current through the resistor 144.

The AND gate 104 and differential amplifier 108 are indicated by the elements enclosed within the dashed line 146. The connection of the elements within dashed line 146 are substantially similar to those within dashed line 126. A pair of transistors 148, 150 are connected in parallel and receive their controlling inputs from the 4th data input associated with the data input B bus. The collectors of transistors 148 and 150 are connected respectively to the collectors of transistors 128, 130. The emitters of transistors 148, 150 are tied together an connected through a transistor 152 to the current sink 140. The transistor 152 receives a controlling input at its base from the NOR gate 96. The NOR gate 96 also has an output which swings between −1.6 volts when not asserted and −2.1 volts when asserted.

The latch 100 corresponds to the elements enclosed within the dashed line 154. A pair of transistors 156, 158 are connected in parallel having their emitters connected together into the current regulator 140 through a transistor 160. The transistor 160 receives a controlling input at its base of a constant regulated voltage $V_R$. The regulated voltage is approximately −1.85 volts and corresponds to approximately the median level of the voltage swings of the inputs to the transistors 138, 152. Feedback is implemented by the collectors of the transistors 156, 158 being connected respectively to the collectors of transistors 128, 148; 130, 150, whereas the controlling inputs to the bases of the transistors 156, 158 are connected to the opposite collectors of transistors 130, 150; 128, 148 respectively. This feedback provides for the latching function.

The write operation of the latch 100 can now be described. When the latch 100 is not being written, the X and Y inputs to transistors 138 and 152 are both unasserted. Consequently, transistor 160 is biased on by the regulated voltage $V_R$. Current flows from the voltage source $V_{CC}$ through transistor 136 and one of the parallel branches of resistor 134 and transistor 158 or resistor 132 and transistor 156, and then through the transistor 160 and current source 140. Which of the parallel current paths is taken is determined by the previous state of the AND gates 126, 146. For example, assume that the fourth data bit associated with the data input A was the last previously written data to the latch 100 and was asserted at that time. Therefore, when the write occurred, the X input into transistor 138 was asserted at the −1.6 volt level, thereby biasing transistor 138 "on" and transistor 160 "off." Similarly, the A4 input to transistor 128 also biased that transistor "on." The inverted input to transistor 130 necessarily biased it "off." Therefore, current flowed from the voltage source $V_{CC}$ through transistor 136, resistor 132, transistor 128, transistor 138, and to the current sink 140. Accordingly, the voltage applied to the base of the transistor 156 was "high", thereby biasing the transistor 156 "on." Conversely, the voltage present at the base of transistor 158 was "low", biasing transistor 158 "off." At the end of the write pulse signal $W_{PULS}$ the signal X will return to its non-asserted state, thereby biasing transistor 138 "off", transistor 160 "on", and causing latching to occur. It can be seen that the current path now includes voltage source $V_{CC}$ transistor 136, resistor 132, transistor 156, transistor 160, and current source 140. The collector of transistor 156 is not asserted and the collector of transistor 158 is asserted. Thus, the value of the fourth data bit associated with the A data bit is stored in the latch 100 in an inverted condition and will remain so stored as long as the voltage source $V_{CC}$ is uninterrupted or until a subsequent write occurs.

It should be noted that the function of the OR gate 110 is accomplished by connecting the emitters of transistors 138, 152, and 160. Similarly the OR gate 98 uses the same kind of connection. The voltage level of the X and Y input signals is sufficient to bias the transistor 160 "off," thereby acting as a clock input to allow the condition of transistors 156 and 158 to be altered.

Now, consider the operation of the latch 100 when the fourth data bit associated with the data input B is to be written and its value is not asserted. Thus, the condition of the latch 100 must be reversed. The inverted value of B4 is "high" and the transistor 150 is biased "on." Concurrent with the write pulse $W_{PULS}$ going "low", the signal Y, delivered to the transistor 152, is asserted and transistor 152 is biased "on." Thus, the collector of transistor 150, which was previously asserted, is now pulled "low" by the current path from system voltage $V_{CC}$ through transistor 136, resistor 134, transistor 150, transistor 152, and current regulator 140. At the same time, transistor 160 is also biased "off" by the asserted Y signal. Accordingly, the signal at the collector of transistor 156, which was previously "low", is now asserted. This signal biases transistor 158 "on," such that at the end of the write pulse signal $W_{PULS}$ the transistor 152 is biased "off," allowing the regulated voltage $V_R$ to bias transistor 160 "on" and provide a current path from system voltage $V_{CC}$ through transistor 136, resistor 134, transistor 158, transistor 160, and the current regulator 140. The voltage levels at the collectors of transistor 156 and 158 are appropriately reversed and will remain in this condition until such time as the system voltage $V_{CC}$ is interrupted or the data bits A4, B4 are asserted and written into the latch 100.

The self-timed register file 44 is of the dual-read variety, which means that two read operations are possible simultaneously. It is even possible for the two read operations to access the same register. The AND gates 112, 114 shown in FIG. 3 correspond respectively to the multiplexers of FIGS. 1 and 2 and are shown in FIG. 6 as the elements enclosed within dashed lines 162, 170 respectively. The AND gate 162 includes a pair of parallel connected transistors 164, 166 having their emitters connected in common through a transistor 168. The collector of transistor 164 is connected to system voltage $V_{CC}$ while the collector of transistor 166 provides the output signal and is connected through a common pull-up resistor shown and discussed in conjunction with FIG. 7. The control voltages applied to the bases of transistor 164, 166 are respectively connected to the collectors of transistors 158, 156 of the latch 100. Thus, the value stored in the latch 100 acts to complementarily bias the transistors 164, 166, whereby when the transistor 168 is biased "on," current flows either through the transistor 164 or the transistor 166. If the inverted value stored in the latch 100 is a zero, transistor 166 is biased "off" and the pull-up resistor provides an asserted signal at the output of the AND gate 112. Thus, the AND gate not only provides the data stored on the latch, but it also inverts the stored data to correspond to the original data input. Conversely, if the value stored in the latch 100 is a one, the transistor 166 is biased "on" and provides a current path through the pull-up resistor, transistor 166, and transistor 168 to ground. The output signal is pulled to a "low" unasserted value.

The AND gate 114 is identical in structure to the AND gate 112 that is shown enclosed within the dashed line 170. The AND gate 114 includes a pair of parallel connected transistors 172, 174 having their emitter connected in common through a transistor 176. The collectors of the transistors 172, 174 are respectively connected to system voltage $V_{CC}$ and to an output line like the AND gate 112. The transistors 172, 174 receive inputs into their respective bases from the collectors of transistors of 158, 156. The only difference between the AND gates 112, 114 is in the enable signal applied to the bases of the enable transistors 168, 176. Transistor 168 receives its enable signal from the A read address contained in the latch 82A and provided by the execution unit 16, whereas the AND gate 114 receives its enable signal from the B read address contained in the latch 82B and provided by the execution unit 16.

It should be noted that it is possible to read two registers concurrently. The multiplexers 54, 56 provide the data separately. Thus, at any one time, of the sixteen registers contained in any group, only one of the registers is read by the A read address. This is also true of the B read address. Therefore, it is preferable for the system to provide a single pull-up resistor and current sink for all of the common bits within a group of 16 registers. For example, the fourth data bit illustrated in FIG. 6 is connected in common with the fifteen remaining fourth data outputs of the other fifteen register in that group to the same pull-up resistor and current sink. This is true for both the B and A read addresses. All common data bits have a common pull-up resistor.

Figure 7:
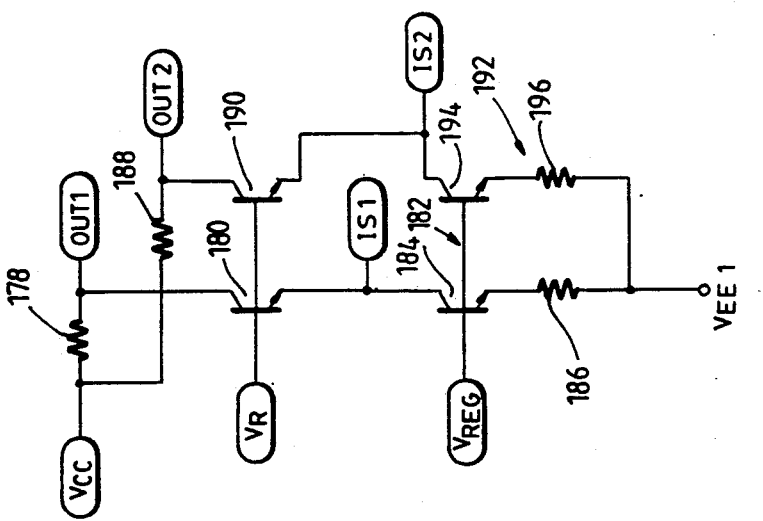
FIG. 7 is an electrical schematic of the common current sink and pull-up resistor for the individual bits of the self timed registers.

Referring now to FIG. 7, the common pull-up resistors and current sink are illustrated. A pull-up resistor 178 is connected at one end to system voltage $V_{CC}$ and at its other end to the collectors of transistors 166 and 180. The base of transistor 180 is connected to the regulated voltage $V_R$ having a value of approximately $-1.85$ volts. The emitter of the transistor 180 is connected to the emitter of the transistor 168 and to the common current sink 182. The current sink 182 includes a transistor 184, having its based controlled by a regulated voltage $V_{REG}$ and its emitter connected through a resistor 186 to $V_{EEI}$.

Operation of the pull-up resistor 178 and current sink 182 can now be described. When the value stored in the latch 100 is a zero, the transistor 166 is biased "off" while the transistor 164 is biased "on". The A read address signal biases transistor 168 "on", thereby causing current to flow from system voltage $V_{CC}$ through the transistors 164, 168 and into the current sink 182. Therefore, the pull-up resistor 178 and transistor 180 are effectively bypassed. Since no current is flowing in the resistor 178, there is no voltage drop across the pull-up resistor 178, and the output voltage at OUT 1 must be system voltage $V_{CC}$. Conversely, if the value stored in the latch 100 is a one then the transistor 166 is biased "on" and the transistor 164 is biased "off." Therefore, when the A read address signal is asserted a current path is formed from $V_{CC}$ through the pull-up resistor 178, transistor 166, transistor 168 and voltage source 182. Thus, the voltage level at OUT 1 is "low".

The pull-up resistor and current sink associated with the AND gate 114 is virtually identical to that previously discussed and includes a pull-up resistor 188 connected to a transistor 190 controlled by the regulated voltage $V_R$ and a current sink 192. The current sink 192 includes transistor 194 connected in series with a resistor 196 and controlled at its base by the regulated voltage $V_{REG}$. The junction of pull-up resistor 188 and transistor 190 is also connected to the collector of the transistor 174, while the junction of the transistor 190 and the current sink 192 is also connected to the emitter of the transistor 176.

Because of the exclusivity of the operation of each register within the groups of registers, an economy of parts can be realized by the use of the single pull-up resistor and current sink for each of the multiplexers 54, 56. Referring now to FIG. 8, a functional diagram of the relationship between the common pull-up resistors, current sink, and registers is illustrated. The sixteen 18-bit registers of the memory temporary register 50' are shown for exemplary purposes only. It should be recognized that the connection of the three remaining sets of registers are substantially identical and are not shown here to avoid unnecessary repetition. Thus, eighteen pull-up resistors 178a-178L are respectively connected to the common data bits 0-17. Similarly, eighteen current sources 182a-182L are also respectively connected to the common data bits 0-17. Thus, it can be seen that when any of the common data bits in the sixteen registers are read, current flows through the corresponding pull-up resistor 178a-178L and current sink 182a-182L.

We claim:

1. A register file constructed from emitter-coupled logic circuits, said register file comprising, in combination:

a plurality of storage registers each having a multiplicity of bit storage cells;

a set of latches responsive to a clock signal, said latches including an address latch for temporarily storing a register address and a data latch for temporarily storing data to be written to an addressed one of the registers during a write operation, said data latch having an output connected to each of said registers;

an address decoder connected to said address latch and said registers for addressing the addressed one of the registers;

a write pulse generator responsive to the clock signal for generating a write pulse enabling the addressed one of the registers to receive stable data from the data latch; and an output multiplexer connected to data outputs of said registers for selectively connecting a data output of a selected one of the registers to a data output port;

wherein the output multiplexer includes for each bit storage cell an emitter-coupled output gate coupled to the bit storage cell and having a data output connection and a current sink connection, and wherein the output multiplexer further includes for each bit position a common pull-up resistor connected to the data output connections of the emitter-coupled output gates of the bit storage cells for said each bit position, and a common current sink connected to the current sink connections of the emitter coupled output gates of the bit storage cell for said each bit position.

2. The register file as claimed in claim 1, wherein each emitter-coupled gate includes a pair of first and second emitter-coupled transistors, and one of said transistors has a collector terminal providing the output connection for said each emitter-coupled gate.

3. The register file as claimed in claim 2, wherein said each emitter-coupled gate further includes a third transistor having a collector connected to the emitters of said first and second emitter-coupled transistors.

4. The register file as claimed in claim 3, wherein said third transistor has an emitter terminal providing said current sink connection.

5. A register file constructed from emitter-coupled logic circuits, said register file comprising, in combination:
- a plurality of storage registers each having a multiplicity of bit storage cells;
- a set of latches responsive to a clock signal, said latches including an address latch for temporarily storing a register address and a data latch for temporarily storing data to be written to an addressed one of the registers during a write operation, said data latch having an output connected to each of said registers;
- an address decoder connected to said address latch and said registers for addressing the addressed one of the registers;
- a write pulse generator responsive to the clock signal for generating a write pulse enabling the addressed one of the registers to receive stable data from the data latch;
- a first output multiplexer connected to data outputs of said registers for selectively connecting a data output of a first selected one of the registers to a first data output port, wherein the first output multiplexer includes for each bit storage cell a first multiplexer emitter-coupled output gate coupled to the bit storage cell and having a data output connection and a current sink connection, and wherein the first output multiplexer further includes for each bit position a first common pull-up resistor connected to the data output connections of the first multiplexer emitter-coupled output gates of the bit storage cell for said each bit position, and a first common current sink connected to the current sink connections of the first multiplexer emitter-coupled output gates of the bit storage cells for said each bit position; and
- a second output multiplexer connected to data outputs of said registers for selectively connecting a data output of a second selected one of the registers to a second data output port, wherein the second output multiplexer includes for each bit storage cell a second multiplexer emitter-coupled output gate coupled to the bit storage cell and having a data output connection and a current sink connection, and wherein the second output multiplexer further includes for each bit position a second common pull-up resistor connected to the data output connections of the second multiplexer emitter-coupled output gates of the bit storage cell for said each bit position, and a second common current sink connected to the current sink connections of the second multiplexer emitter-coupled output gates of the bit storage cells for said each bit position.

6. The register file as claimed in claim 5, wherein each emitter-coupled gate includes a pair of first and second emitter-coupled transistors, and one of said transistors has a collector terminal providing the output connection for said each emitter-coupled gate.

7. The register file as claimed in claim 6, wherein said each emitter-coupled gate further includes a third transistor having a collector connected to the emitters of said first and second emitter-coupled transistors.

8. The register file as claimed in claim 7, wherein said third transistor has an emitter terminal providing said current sink connection.

9. A register file constructed from emitter-coupled logic circuits, said register file comprising, in combination:
- a plurality of storage registers each having a multiplicity of bit storage cells, each of said bit storage cells having a data output; and
- an output multiplexer connected to the data outputs of said bit storage cells for selectively connecting the data outputs of bit storage cells in a selected one of the registers to a data output port;
- wherein the output multiplexer includes for each bit storage cell an emitter-coupled output gate having an input connected to the data output of the bit storage cell, a data output connection and a current sink connection, and wherein the output multiplexer further includes for each bit position a common pull-up resistor connected to the data output connections of the emitter-coupled output gates of the bit storage cells for said each bit position, and a common current sink connected to the current sink connections of the emitter-coupled output gates of the bit storage cell for said each bit position.

10. The register file as claimed in claim 9, wherein said register file further includes self timed means for writing data into a selected one of said registers.

11. The register file as claimed in claim 9, wherein each emitter-coupled gate includes a pair of first and second emitter-coupled transistors, one of which has a collector terminal providing the output connection for said each emitter-coupled gate, and the other of which has a base connected to the data output of its respective bit storage cell; and a third transistor having a collector connected to the emitters of said first and second emitter-coupled transistors, and an emitter terminal providing said current sink connection.

* * * * *

UNITED STATES PATENT AND TRADEMARK OFFICE
CERTIFICATE OF CORRECTION

PATENT NO. : 5,107,462
DATED : APR. 21, 1992
INVENTOR(S) : WILLIAM R. GRUNDMANN ET AL.

It is certified that error appears in the above-identified patent and that said Letters Patent is hereby corrected as shown below:

On the Title page, item [75] Inventors, should include -- Irene H. Fernandez, San Carlos, CA --.

In the Abstract, line 1, "time" should read -- timed --.

In Col. 1, line 49, "07/306,342" should read -- 07/306,343 --.

In Col. 4, line 19, "sink" should read -- sinks --.

In Col. 9, line 5, "80a-80a" should read -- 80a-80q --.

In Col. 11, line 23, "80a-80a" should read -- 80a-80q --.

In Col. 12, line 18, "an" should read -- and --.

In Col. 13, line 13, "an" should read -- and --.

In Col. 15, line 30, "register" should read -- registers --; line 35, "sink" should read -- sinks --; and line 43, "based" should read -- base --.

Signed and Sealed this

Seventh Day of September, 1993

Attest:

BRUCE LEHMAN

*Attesting Officer*      *Commissioner of Patents and Trademarks*